United States Patent
Huang et al.

(10) Patent No.: US 12,526,182 B2
(45) Date of Patent: Jan. 13, 2026

(54) NETWORK CONFIGURATION SENDING METHOD AND APPARATUS, STORAGE MEDIUM, AND ELECTRONIC DEVICE

(71) Applicant: ZTE Corporation, Shenzhen (CN)

(72) Inventors: Guangping Huang, Shenzhen (CN); Yong Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 419 days.

(21) Appl. No.: 18/027,170

(22) PCT Filed: May 31, 2021

(86) PCT No.: PCT/CN2021/097389
§ 371 (c)(1),
(2) Date: Mar. 20, 2023

(87) PCT Pub. No.: WO2022/068244
PCT Pub. Date: Apr. 7, 2022

(65) Prior Publication Data
US 2023/0362053 A1 Nov. 9, 2023

(30) Foreign Application Priority Data

Sep. 29, 2020 (CN) .......................... 202011057076.X (51) Int. Cl.
*H04L 41/0803* (2022.01)
*H04L 41/0893* (2022.01)
*H04L 41/5003* (2022.01)

(52) U.S. Cl.
CPC ...... *H04L 41/0803* (2013.01); *H04L 41/0893* (2013.01); *H04L 41/5003* (2013.01)

(58) Field of Classification Search
CPC ............... H04L 41/0803; H04L 41/085; H04L 41/0893; H04L 41/5003
See application file for complete search history.

(56) References Cited

U.S. PATENT DOCUMENTS

| | | | |
|---|---|---|---|
| 2002/0194323 A1* | 12/2002 | Chantrain | H04L 67/51 709/246 |
| 2013/0182708 A1 | 7/2013 | Sharma | |
| 2016/0198025 A1* | 7/2016 | Morimoto | H04L 12/413 370/392 |

FOREIGN PATENT DOCUMENTS

| | | |
|---|---|---|
| CN | 103249091 A | 8/2013 |
| CN | 104584504 A | 4/2015 |

(Continued)

OTHER PUBLICATIONS

Shu-jun Hu, "An Information Processing Method, Apparatus, System, and Computer Readable Storage Medium", May 3, 2019, CN 109714271 A (English Translation), pp. 1-34 (Year: 2019).*

(Continued)

*Primary Examiner* — Jonathan A Bui
(74) *Attorney, Agent, or Firm* — CANTOR COLBURN LLP (57) ABSTRACT

Embodiments of the present disclosure provide a network configuration sending method and apparatus, a storage medium, and an electronic device. The method includes: determining N rule-action pairs corresponding to Quality of Service (QoS) configuration information of each layer in Hierarchical Quality of Service (HQoS) configuration, wherein the N rule-action pairs are used for representing network configuration rules and network configuration actions corresponding to the QoS configuration information, and N is a natural number greater than or equal to 1; and sending, to a forwarding plane of a Broadband Remote Access System (BRAS), target QoS configuration information mapped with the N rule-action pairs, wherein the forwarding plane is used for configuring the target QoS configuration information into a target device to configure a network of the target device.

19 Claims, 5 Drawing Sheets

(56) References Cited

FOREIGN PATENT DOCUMENTS

| | | | |
|---|---|---|---|
| CN | 105991713 | A | 10/2016 |
| CN | 108206772 | A | 6/2018 |
| CN | 109714271 | A | 5/2019 |
| CN | 111193644 | A | 5/2020 |
| CN | 112491576 | A | 3/2021 |

OTHER PUBLICATIONS

Xin-Yue Fan, "Adaptation Method and System of South Interface", Mar. 22, 2019, CN 109981363 B (English Translation), pp. 1-30 (Year: 2019).*

International Search Report for corresponding application PCT/CN2021/097389 filed May 31, 2021; Mail date Aug. 27, 2021.

* cited by examiner

NETWORK CONFIGURATION SENDING METHOD AND APPARATUS, STORAGE MEDIUM, AND ELECTRONIC DEVICE

CROSS REFERENCE

This application is a National Stage Filing of the PCT International Application No. PCT/CN2021/097389 filed on May 31, 2021, which claims priority to Chinese Patent Application No. 202011057076. X filed on Sep. 29, 2020, the entirety of which is herein incorporated by reference.

TECHNICAL FIELD

Embodiments of the present disclosure relates to the technical field of communications, in particular to a network configuration sending method and apparatus, a storage medium, and an electronic device.

BACKGROUND

As a basic access service of home broadband, enterprise dedicated lines, public Wireless Fidelity (WiFi), etc., wired broadband access is a second mainstream broadband access service besides the mobile broadband. With the rapid development of emerging access services such as interactive personality television (IPTV) and high-definition videos, a traditional mode in which forwarding and control planes of a Broadband Remote Access System (BRAS) are integrated is increasingly not applicable to demands for rapid development and delivery of cloud-based network architectures and new services. The separation of the forwarding and control planes of the BRAS based on a Software-Defined Network/Network Function Virtualization (SDN/NFV) has become an industrial consensus, and has been commercially deployed in some domestic and international markets. The relevant international and domestic standards are also being actively standardized to realize the interconnection and intercommunication between the forwarding plane and the control plane of access devices.

In a mechanism of separation of the forwarding and control planes of the BRAS, the control plane is responsible for centralized processing of user access and user service policies, and delivering of user Access Control List & Quality of Service (ACL&QoS) policies to the forwarding plane for deployment and execution. In general, the control plane sends a user service policy to the forwarding plane through a management interface. For example, the control plane sends a Yet Another Next Generation (YANG) model by using a Network Configuration (NETCONF) protocol of the management interface. The forwarding plane of the forwarding and control plane separated BRAS implements Hierarchical Quality of Service (HQoS). However, for the hierarchy and architecture design of the YANG model, it is inevitable that different manufacturers have different device architecture and hierarchy designs, so it is difficult to unify the standardization. For example, it is very complex and even impossible to design a standardized QoS policy based on a YANG model to achieve intercommunication between different manufacturers.

For the above technical problems, no effective solutions have been proposed in relevant technology.

SUMMARY

The embodiments of the present disclosure provide a network configuration sending method and apparatus, a storage medium, and an electronic device, which may at least solve the problem of difficulty in effective intercommunication between forwarding and control plane separated models in the related art.

According to some embodiments of the present disclosure, a network configuration sending method is provided, including: determining N rule-action pairs corresponding to Quality of Service (QoS) configuration information of each layer in Hierarchical Quality of Service (HQoS) configuration, wherein the N rule-action pairs are used for representing network configuration rules and network configuration actions corresponding to the QoS configuration information, and N is a natural number greater than or equal to 1; and sending, to a forwarding plane of a Broadband Remote Access System (BRAS), target QoS configuration information mapped with the N rule-action pairs, wherein the forwarding plane is used for configuring the target QoS configuration information into a target device to configure a network of the target device.

According to some embodiments of the present disclosure, a network configuration sending apparatus is provided, including: a first determining module, configured to determine N rule-action pairs corresponding to QoS configuration information of each layer in HQoS configuration, wherein the N rule-action pairs are used for representing network configuration rules and network configuration actions corresponding to the QoS configuration information, and N is a natural number greater than or equal to 1; and a first sending module, configured to send, to a forwarding plane of a BRAS, target QoS configuration information mapped with the N rule-action pairs, wherein the forwarding plane is used for configuring the target QoS configuration information into a target device to configure a network of the target device.

According to some embodiments of the present disclosure, a network configuration apparatus is provided, including: a first receiving module, configured to receive an upper-layer application message sent by a control plane of a BRAS; a first parsing module, configured to parse the upper-layer application message to obtain N rule-action pairs encapsulated in the upper-layer application message, wherein the N rule-action pairs are used for representing network configuration rules and network configuration actions corresponding to QoS configuration information, and N is a natural number greater than or equal to 1; a second determining module, configured to determine target QoS configuration information mapped with the N rule-action pairs; and a first configuration module, configured to configure the target QoS configuration information into a target device to configure a network of the target device.

According to some embodiments of the present disclosure, a computer-readable storage medium is further provided. The computer-readable storage medium stores a computer program. The computer program is configured to, when running, implement the operations in any of the above method embodiments.

According to some embodiments of the present disclosure, an electronic device is further provided, including a memory and a processor. The memory stores a computer program. The processor is configured to, when running the computer program, implement the operations in any of the above method embodiments.

By means of the embodiments of the present disclosure, a control plane of a BRAS determines N rule-action pairs corresponding to QoS configuration information of each layer in HQoS configuration, wherein the N rule-action pairs are used for representing network configuration rules and network configuration actions corresponding to the QoS configuration information, and N is a natural number greater than or equal to 1; and the control plane sends, to a forwarding plane of a BRAS, target QoS configuration information mapped with the N rule-action pairs, wherein the forwarding plane is used for configuring the target QoS configuration information into a target device to configure a network of the target device. The target device can flexibly select configuration data according to the structure of the target device, without being constrained by a data structure of a traditional YANG model. Therefore, the problem of difficulty in effective intercommunication between forwarding and control plane separated models in the related art can be solved, and effective intercommunication between forwarding and control plane separated models from different manufactures can be achieved.

DETAILED DESCRIPTION

The embodiments of the present disclosure will be described in detail below with reference to the accompanying drawings and in combination with the embodiments.

It should be noted that the terms "first", "second", etc. in the specification and claims of the present disclosure and the above drawings are used to distinguish similar objects, and do not have to be used to describe a specific order or sequence.

Figure 1:
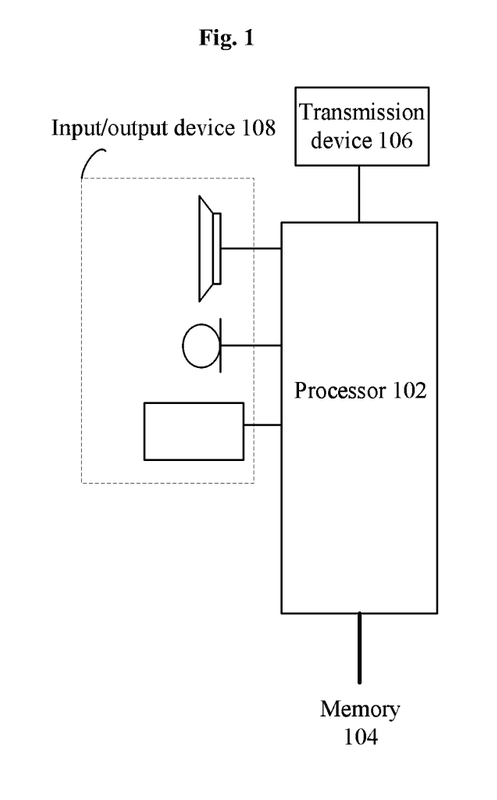
FIG. 1 is a structural block diagram of hardware of a mobile terminal of a network configuration sending method according to the embodiments of the present disclosure.

The method embodiments provided in the embodiments of the present disclosure can be implemented in a mobile terminal, a computer terminal or a similar arithmetic unit. Running of the embodiments on a mobile terminal is taken as an example. FIG. 1 is a structural block diagram of hardware of a mobile terminal of a network configuration sending method according to the embodiments of the present disclosure. As shown in FIG. 1, the mobile terminal can include one or more (only one is shown in FIG. 1) processors 102 (the processor 102 can include, but is not limited to, a processing device such as a microprocessor MCU or a field programmable logic device (FPGA)) and a memory 104 configured to store data. The mobile terminal can also include a transmission device 106 configured as a communication function and an input/output device 108. Those having ordinary skill in the art can understand that the structure shown in FIG. 1 is only schematic, and does not limit the structure of the mobile terminal. For example, the mobile terminal may further include more or fewer components than those shown in FIG. 1, or have a different configuration from that shown in FIG. 1.

The memory 104 may be configured to store computer programs, such as software programs and modules of application software, such as computer programs corresponding to the network configuration sending method in an embodiment of the present disclosure. The processor 102 executes various functional applications and data processing by running the computer programs stored in the memory 104, that is, to achieve the above method. The memory 104 may include a high-speed Random Access Memory (RAM), and may further include a non-volatile memory, such as one or more magnetic storage apparatuses, a flash memory, or other non-volatile solid-state memories. In some examples, the memory 104 may further include a memory remotely provided with respect to the processor 102, and these remote memories may be connected to the mobile terminal through a network. Examples of the above network include, but are not limited to, the Internet, an intranet, a local area network, a mobile communication network, and combinations thereof.

The transmission apparatus 106 is configured to receive or send data via a network. The specific example of the network may include a wireless network provided by a communication provider of the mobile terminal. In one example, the transmission apparatus 106 includes a Network Interface Controller (NIC), which may be connected to other network devices through a base station, so as to communicate with the Internet. In one example, the transmission apparatus 106 may be a Radio Frequency (RF) module, which is configured to communicate with the Internet in a wireless manner.

Figure 2:
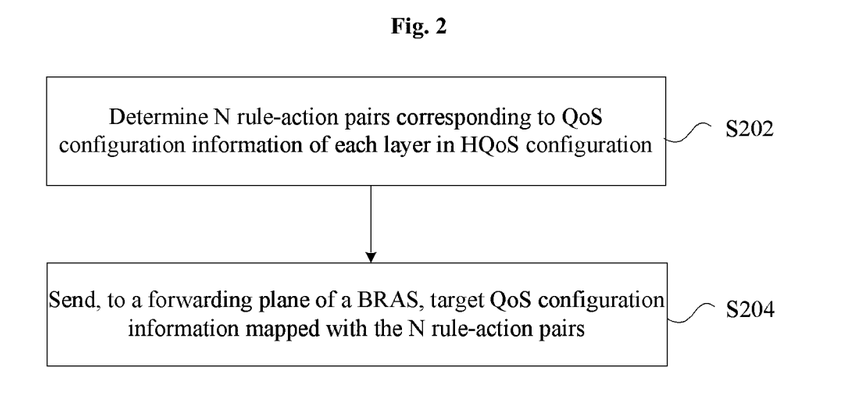
FIG. 2 is a flow diagram of a network configuration sending method according to the embodiments of the present disclosure.

The embodiments provide a network configuration sending method. FIG. 2 is a flow diagram of a network configuration sending method according to the embodiments of the present disclosure. As shown in FIG. 2, the method includes the following operations.

At S202, N rule-action pairs corresponding to QoS configuration information of each layer in HQoS configuration are determined, wherein the N rule-action pairs are used for representing network configuration rules and network configuration actions corresponding to the QoS configuration information, and N is a natural number greater than or equal to 1.

At S204, target QoS configuration information mapped with the N rule-action pairs is sent to a forwarding plane of a BRAS, wherein the forwarding plane is used for configuring the target QoS configuration information into a target device to configure a network of the target device.

The above operations may be, but is not limited to be, performed by a control plane of the BRAS.

By means of the above operations, a control plane of a BRAS determines N rule-action pairs corresponding to QoS configuration information of each layer in HQoS configuration, wherein the N rule-action pairs are used for representing network configuration rules and network configuration actions corresponding to the QoS configuration information, and N is a natural number greater than or equal to 1; and the control plane sends, to a forwarding plane of a BRAS, target QoS configuration information mapped with the N rule-action pairs, wherein the forwarding plane is used for configuring the target QoS configuration information into a target device to configure a network of the target device. The target device can flexibly select configuration data according to the structure of the target device, without being constrained by a data structure of a traditional YANG model. Therefore, the problem of difficulty in effective intercommunication between forwarding and control plane separated models in the related art can be solved, and effective intercommunication between forwarding and control plane separated models from different manufactures can be achieved.

In some exemplary embodiments, the operation that the N rule-action pairs corresponding to the QoS configuration information of each layer in the HQoS configuration are determined includes the following operations S1 to S3.

At S1, the QoS configuration information of each layer in the HQoS configuration is defined based on a preset protocol.

At S2, rule information and action information corresponding to the QoS configuration information of each layer in the HQoS configuration are determined, wherein the rule information includes a rule type, a rule length and a rule value, and the action information includes an action type, an action length and an action value.

At S3, the N rule-action pairs corresponding to the QoS configuration information of each layer in the HQoS configuration are determined based on the rule information and the action information.

In the embodiments, the preset protocol includes, but is not limited to, a Simple-Control and User Plane Separation Protocol (S-CUSP), a Border Gateway Protocol-Link State (BGP-LS), a Path Computation Entity Protocol (PCEP), and/or a TR-459 Packet Forwarding Control Protocol (PFCP).

In some exemplary embodiments, the operation that the target QoS configuration information mapped with the N rule-action pairs is sent to the forwarding plane of the BRAS includes the following operation S1.

At S1, the target QoS configuration information mapped with the N rule-action pairs is sent to the forwarding plane of the BRAS based on structural information between the N rule-action pairs and the target QoS configuration information, wherein the structural information includes a mapping relationship between the N rule-action pairs and the target QoS configuration information.

In the embodiments, the control plane of the forwarding and control plane separated BRAS sends configuration information to the forwarding plane according to the QoS configuration information and two-stage structure of the rule-action pairs, and the forwarding plane selects to configure or not configure the configuration information according to structural features of the local device.

In some exemplary embodiments, after the N rule-action pairs corresponding to the QoS configuration information of each layer in the HQoS configuration are determined, the method may further include one of the following operations S1 and S2.

At S1, a Type Length Value (TLV) of the QoS configuration information of each layer is determined.

At S2, one or more rule-action pair combinations corresponding to the QoS configuration information is determined according to semantic information of the TLV, wherein the N rule-action pairs include the one or more rule-action pair combinations.

In some exemplary embodiments, after the N rule-action pairs corresponding to the QoS configuration information of each layer in the HQoS configuration are determined, the method may further include one of the following operations S1 to S3.

At S1, one or more rule-action pair combinations corresponding to the QoS configuration information are determined, wherein the N rule-action pairs include the one or more rule-action pair combinations.

At S2, a transmission message for data transmission between a control plane and the forwarding plane of the BRAS is determined.

At S3, the one or more rule-action pair combinations are determined as a data load of the transmission message based on a message type of the transmission message.

In the embodiments, the type of one rule-action pair defines only one rule and action combination to form a specific ACL&QoS basic configuration unit. One piece of QoS configuration information is composed of one or more rule-action pairs.

In some exemplary embodiments, the operation that the target QoS configuration information mapped with the N rule-action pairs is sent to the forwarding plane of the BRAS includes the following operations S1 and S2.

At S1, the N rule-action pairs are encapsulated to an upper-layer application message.

At S2, the upper-layer application message is sent to the forwarding plane, wherein the forwarding plane is used for de-encapsulating and parsing the upper-layer application message to obtain the N rule-action pairs, so as to determine the target QoS configuration information mapped by the N rule-action pairs, and configuring the target QoS configuration information into the target device to configure the network of the target device.

In the embodiments, the rules and actions corresponding to various policies are nested and encapsulated in the data load of the upper-layer application message by means of a rule-action pair TLV. The control plane of the forwarding and control plane separated BRAS sends the upper-layer application message to the forwarding plane, and the forwarding plane de-encapsulates, parses and reads semantic values of the TLVs of all stages, and configures corresponding ACL&QoS policy, or ignores TLVs that are not suitable for a local device.

In some exemplary embodiments, the operation that the target QoS configuration information mapped with the N rule-action pairs is sent to the forwarding plane of the BRAS includes:

the target QoS configuration information mapped with the N rule-action pairs is sent to the forwarding plane of the BRAS by using a state interface protocol.

In the embodiments, configuration data is issued by using a control interface protocol such as the S-CUSP and the PFCP, which is more efficient and flexible.

Figure 3:
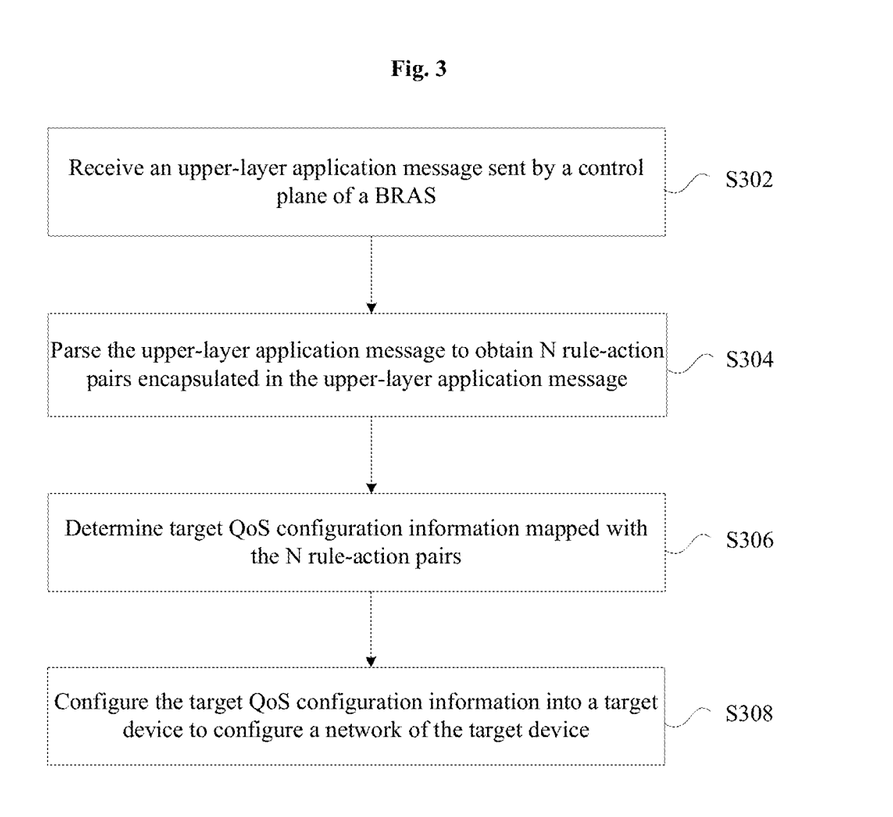
FIG. 3 is a flow diagram of a network configuration method according to the embodiments of the present disclosure.

The embodiments provide a network configuration method. FIG. 3 is a flow diagram of a network configuration method according to the embodiments of the present disclosure. As shown in FIG. 3, the method includes the following operations S302 to S308.

At S302, an upper-layer application message sent by a control plane of a BRAS is received.

At S304, the upper-layer application message is parsed to obtain N rule-action pairs encapsulated in the upper-layer application message, wherein the N rule-action pairs are used for representing network configuration rules and network configuration actions corresponding to QoS configuration information, and N is a natural number greater than or equal to 1.

At S306, target QoS configuration information mapped with the N rule-action pairs is determined.

At S308, the target QoS configuration information is configured into a target device to configure a network of the target device.

The above operations may be, but is not limited to be, performed by a forwarding plane of the BRAS.

By means of the above operations, the forwarding plane receives an upper-layer application message sent by a control plane of a BRAS, parses the upper-layer application message to obtain N rule-action pairs encapsulated in the upper-layer application message, wherein the N rule-action pairs are used for representing network configuration rules and network configuration actions corresponding to QoS configuration information, and N is a natural number greater than or equal to 1, determines target QoS configuration information mapped with the N rule-action pairs, and configures the target QoS configuration information into a target device to configure a network of the target device. The target device can flexibly select configuration data according to the structure of the target device, without being constrained by a data structure of a traditional YANG model. Therefore, the problem of difficulty in effective intercommunication between forwarding and control plane separated models in the related art can be solved, and effective intercommunication between forwarding and control plane separated models from different manufactures can be achieved.

The present disclosure is described below in combination of exemplary embodiments.

For a hierarchical QoS system of a forwarding plane of a forwarding and control plane separated BRAS, granularities, from coarse to fine, for QoS policies include, for example, QoS policy per device interface, per sub-interface, per user group, per user, and per user service (per service flow). In a configuration scheme for a YANG model, the control plane needs to nest and configure the policies in turn, and sends the policies to the forwarding plane by using the NETCONF protocol of the management interface. The policies are usually configured in the same YANG model table. The forwarding plane configures the QoS policies for device interfaces and users according to the hierarchical QoS YANG model.

This embodiment proposes a flattened issuance and configuration process for QoS policies of a forwarding and control plane separated BRAS based on a TLV. That is, for hierarchical QoS policies of the forwarding plane of the BRAS, one or more rule-action pairs are defined for each layer, and the corresponding QoS policies may be mapped by combinations of the rule-action pairs. The forwarding plane can select, according to a specific structural condition of a device, the rule-action pairs supported by the device for parsing, deployment and configuration. The rule-action pairs or combinations that are not supported by the device will be ignored directly. Therefore, different forwarding plane devices do not need to support a unified configuration data structure of the YANG model, thus flexibly and efficiently solving the problem of intercommunication between hierarchical QoS YANG models from different manufacturers.

In particular, the TLV-based QoS rule-action pairs do not need to be issued by using the NETCONF protocol of the management interface, but can be issued by using the state control interface protocol, so that the flexibility is better and the issuing efficiency is higher.

Figure 4:
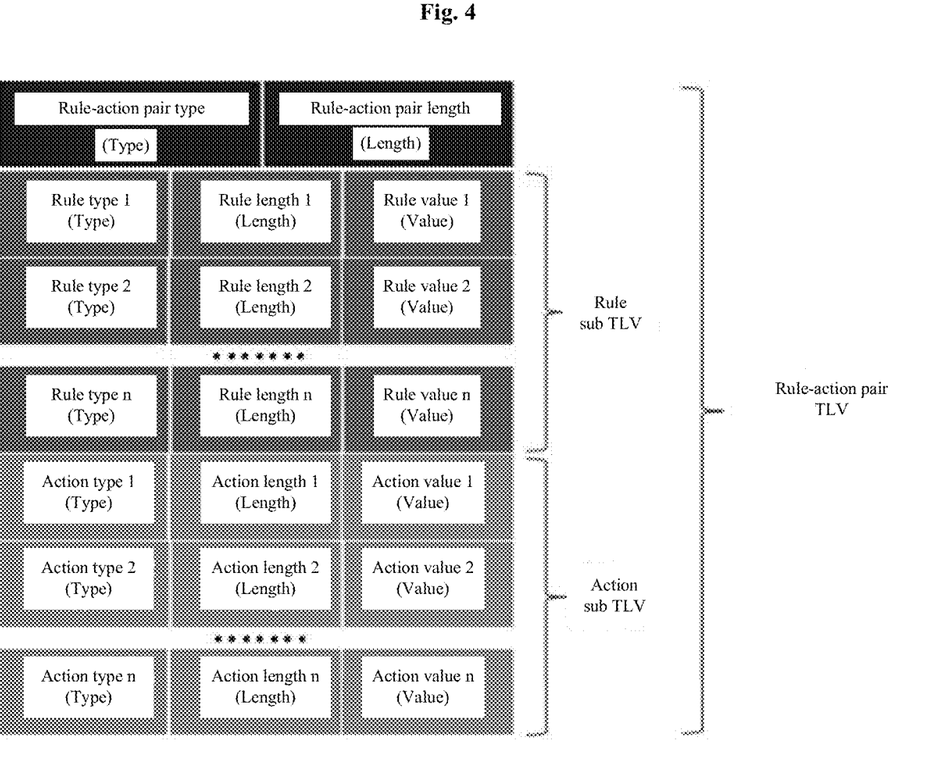
FIG. 4 is a structural diagram of a two-stage TLV of an ACL&QoS rule-action pair of a forwarding plane of a forwarding and control plane separated BRAS according to the embodiments of the present disclosure.
Figure 5:
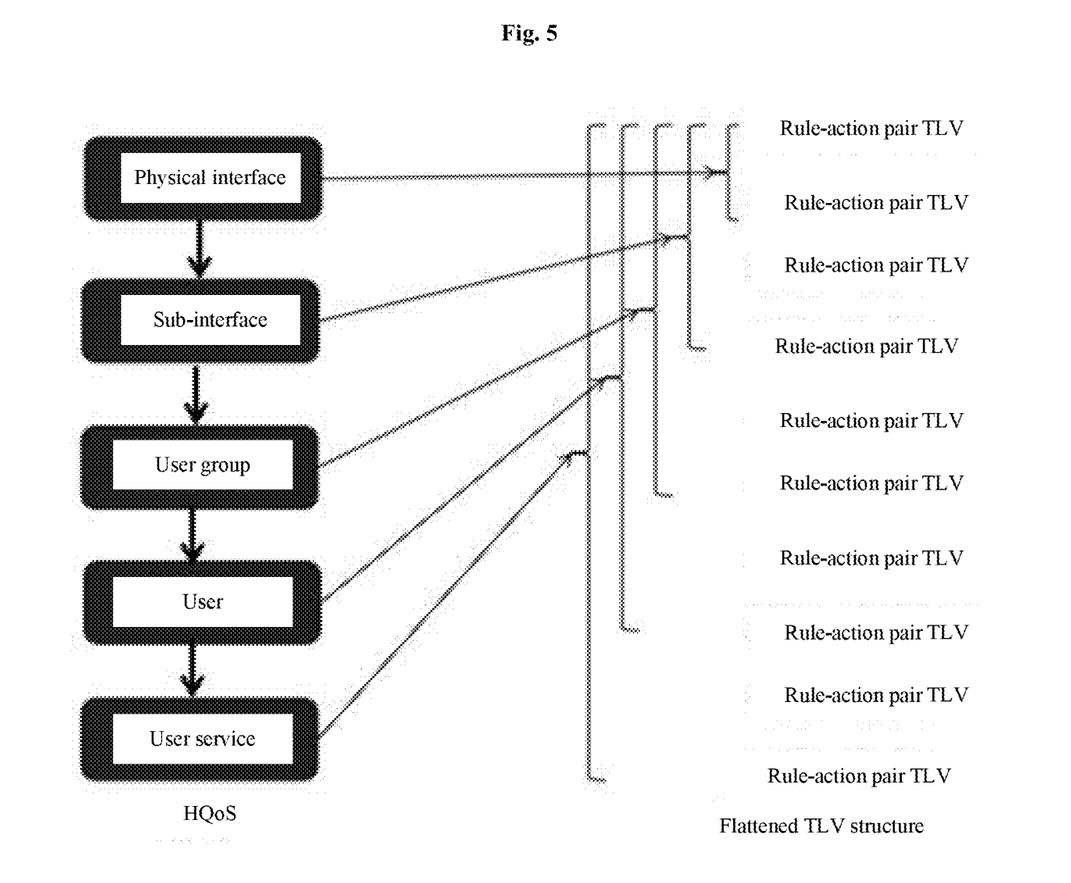
FIG. 5 is a diagram of a flat mode of an ACL&QoS rule-action pair of a forwarding plane of a forwarding and control plane separated BRAS according to the embodiments of the present disclosure.

In the present exemplary embodiment, the ACL&QoS rule-action pair of the forwarding plane of the BRAS is a two-stage TLV structure based on a basic rule and a basic action. As shown in FIG. 4, one rule-action pair type defines a unique rule and action combination to form a specific ACL&QoS basic configuration unit. One QoS policy is composed of one or more rule-action pairs. The control plane of the forwarding and control plane separated BRAS sends an ACL&QoS configuration policy to the forwarding plane according to the two-stage structure of a policy and rule-action pair, and the forwarding plane selects to configure or not configure the policy according to structural features of the local device. Under the two-stage TLV structure, the hierarchical QoS of the forwarding plane of the BRAS achieves flattened issuing, which is not constrained by an entire hierarchical data structure, as shown in FIG. 5.

In a rule-action pair TLV message structure, the ACL&QoS policy of the forwarding plane of the forwarding and control plane separated BRAS may be embodied in the following two ways.

ACL&QoS policy TLV: a TLV is defined for each hierarchical ACL&QoS policy, a rule-action pair combination contained in the TLV is defined by the semantics of the ACL&QoS policy TLV, and the rule-action pair TLV is used as a subordinate nested TLV of the ACL&QoS policy TLV.

The ACL&QoS policy is represented by a type of a message issued by the control plane of the forwarding and control plane separated BRAS, and a rule-action pair TLV combination contained in the policy is used as a data load of the message.

As shown in FIG. 5, basic configuration of the QoS policy is generated by the control plane through the rule-action pair TLV and is issued to the forwarding plane through the control interface. Each rule-action pair is parsed alone by the forwarding plane, and the corresponding rule-action pair TLVs are deployed or ignored according to the structural features of the local device and public configuration requirements of an operator. Since the rule-action pair TLV is arranged and sent according to non-hierarchical structures, the forwarding plane device is no longer constrained by the traditional hierarchical structure of the ACL&QoS YANG model.

The hierarchical ACL&QoS policy of the forwarding plane of the forwarding and control plane separated BRAS includes a series of basic matching rules and basic processing actions. Typical basic rules and basic actions are listed respectively according to ACL policies, interface QoS policies, and user (including user groups) QoS policies. The solution in the exemplary embodiments of the present disclosure aims to replace the traditional YANG model by means of the flattened QoS policy mode of the rule-action pair TLV. For other newly added and expanded rules and actions in the future, QoS policy construction, issuing, deployment and configuration may also be implemented based on the above two-stage TLV structure.

Exemplary embodiment 1: an extension scheme of an ACL&QoS policy rule-action pair TLV of the forwarding plane of the forwarding and control plane separated BRAS based on an RFC 8772 S-CUSP interface.

ACL&QoS policy TLVs per physical interface, per sub-interface, per user group and per user, and per service flow are extended and defined in the S-CUSP TLV type, and the rules and actions corresponding to various policies are nested and encapsulated in the data load of the upper-layer application message by means of a rule-action pair TLV. The control plane of the forwarding and control plane separated BRAS sends the upper-layer application message to the forwarding plane, and the forwarding plane de-encapsulates, parses and reads semantic values of the TLVs of all stages, and configures corresponding ACL&QoS policy, or ignores TLVs that are not suitable for a local device.

In the present exemplary embodiment, the following three types of TLVs are extended and defined:

I. ACL policy three-stage TLV
1, ACL policy TLV;
2, two-stage rule-action pair TLV;
3, three-stage rule TLV, the format of rules adopting an IPFilterRule attribute way defined by RFC 6733:
action dir proto from src to dst
For example:
permit in 1p from assigned to any
Parameters in IPFilterRule are described in Table 1:

TABLE 1

| Parameter | Value | Description |
|---|---|---|
| action | permit | Allow executing subsequent actions for all messages matching the rules |
| | deny | Discard the messages matching the rules |
| dir | in | Message in direction |
| | out | Message out direction |
| proto | ip | Match all ipv4 messages |
| | ipv6 | Match all ipv6 messages |
| | tcp | Match TCP messages |
| | udp | Match UDP messages |
| | sctp | Match SCTP messages |
| | <proto-val> | Protocols carried in an IP packet are assigned by means of numerical values Range: 0 . . . 255 6 TCP 17 UDP 80 HTTP 132 SCTP and the like |
| src and dst | assigned | Mark an IP address identification user side assigned to a terminal |
| | any | Any ip address |
| | <address/mask> [ports] | address/mask: Specify an accurate ip address. ports: Specify ports Available formats are as follows: address: Only specify ip, and default full mask matching for example: 192.168.0.1 for example: 2002:1::0 for example: 0.0.0.0, corresponding to any, any ipv4 address is matched for example: 0:: , corresponding to any, any ipv6 address is matched address/mask: ip and mask are specified for example: 192.168.0.0/16 for example: 2002:1111:2222::0/48 for example: 0.0.0.0/0, corresponding to any, any ipv4 address is matched for example: 0::/0, corresponding to any, any ipv6 address is matched address/mask <ports>: Specify IP and mask as well as port number. When a matched ipv4/ipv6 message is a TCP, UDP or SCTP message, a port number or a port number range can be specified. For example: 192.168.0.0/16 3000 4000-5000 |

4, three-stage basic action TLV:
discard;
forward;
redirect-ip;
redirect-http (redirect http messages);
redirect-nat (redirect CGN servces);
car (perform car speed limitation);
remark-ipv4-dscp (set the DSCP domain in the IPv4 header);
remark-ipv6-dscp (set the DSCP domain in the IPv6 header);
remark-mpls-exp (set the EXP domain of the MPLS header);
UPF predefine action (action predefined by UPF)
II. Interface QoS policy TLV:
Interface QoS policy one-stage TLV;
Interface QoS policy rule-action pair two-stage TLV;
Interface QoS policy basic rule three-stage TLV;
Hierarchical examples;
Match QinQ C-Vlan ID;
Match QinQ S-Vlan ID;
Rules predefined by UPF.
4, Interface QoS policy basic action three-stage TLV:
Interface queue priority classification identification;
Strict priority scheduling level;
WFQ scheduling weight percentage;
Message queueout integer rate, e.g., Committed information rate (CIR) in Kbps;
Message queueout integer token bucket size, e.g., Committed Burst Size (CBS) in Kbytes;
Queue depth (cache) size;
Dscard priority of WRED;
Low threshold of discarding of WRED;
Low threshold of discarding of WRED;
Actions predefined by UPF.
I. User QoS policy TLV:
1, user QoS policy one-stage TLV;
2, user QoS policy rule-action pair two-stage TLV;
3, user QoS policy basic rule three-stage TLV:
Examples for hierarchy:
ipv4-dcsp (match IPv4 DSCP<0-63>);
ipv6-dcsp (match IPv6 DSCP<0-63>);
vlan-802.1p (match VLAN 802.1p<0-7>);
cvlan (match QinQ C-Vlan ID);
svlan (match the QinQ S-Vlan ID);
ipv4-acl (match IPv4 ACL);
Ipv6-acl (match IPv6 ACL);
Rules predefined by UPF.
4, User QoS policy action TLV:
and-or (a logical relationship between flow classifications);
fast-forward (low-latency fast forwarding);
schedule-grade (strict priority scheduling grade);
wfq-sch-percentage (WFQ scheduling weight percentage);
Cir (traffic limit promised rate, e.g., CIR);
Cbs (traffic limit promised token bucket size, e.g., CBS);
Pir (traffic limit peak rate, e.g., PIR);
PBS (traffic limit peak token bucket size, e.g., PbS);
queue-cache (queue depth (cache));
wred-discard-priority (discard priority of WRED)
wred-discard-high (low threshold of discard of WRED);
wred-discard-low (low threshold of discard of WRED);
Wred-discard-prob (discard probability of WRED);
UPF predefine action (action predefined by UPF)
Exemplary embodiment 2: an extension scheme of an ACL&QoS policy rule-action pair TLV of the forwarding plane of the forwarding and control plane separated BRAS based on a BGP-LS protocol.
ACL&QoS policy TLVs per physical interface, per sub-interface, per user group and per user, and per service flow are extended and defined in the BGP-LS protocol TLV type, and the rules and actions corresponding to various policies are nested and encapsulated in the data load of the upper-layer application message by means of a rule-action pair TLV. The control plane of the forwarding and control plane separated BRAS sends the upper-layer application message to the forwarding plane, and the forwarding plane de-encapsulates, parses and reads semantic values of the TLVs of all stages, and configures corresponding ACL&QoS policy, or ignores TLVs that are not suitable for a local device.

In the present exemplary embodiment, the following three types of TLVs are extended and defined:

I. ACL policy three-stage TLV
1, ACL policy TLV;
2, two-stage rule-action pair TLV;
3, three-stage rule TLV, the format of rules adopting an IPFilterRule attribute way defined by RFC 6733:
action dir proto from src to dst
For example:
permit in ip from assigned to any
Parameters in IPFilterRule are described in Table 2:

TABLE 2

| Parameter | Value | Description |
|---|---|---|
| action | permit | Allow executing subsequent actions for all messages matching the rules |
|  | deny | Discard the messages matching the rules |
| dir | in | Message in direction |
|  | out | Message out direction |
| proto | ip | Match all ipv4 messages |
|  | ipv6 | Match all ipv6 messages |
|  | tcp | Match TCP messages |
|  | udp | Match UDP messages |
|  | sctp | Match SCTP messages |
|  | <proto-val> | Protocols carried in an IP packet are assigned by means of numerical values Range: 0 . . . 255 6 TCP 17 UDP 80 HTTP 132 SCTP and the like |
| src and dst | assigned | Mark an IP address identification user side assigned to a terminal |
|  | any | Any ip address |
|  | <address/mask> [ports] | address/mask: Specify an accurate ip address. ports: Specify ports Available formats are as follows: (1) address: Only specify ip, and default full mask matching for example: 192.168.0.1 for example: 2002:1::0 for example: 0.0.0.0, corresponding to any, any ipv4 address is matched for example: 0::, corresponding to any, any ipv6 address is matched (2) address/mask: ip and mask are specified for example: 192.168.0.0/16 for example: 2002:1111:2222::0/48 for example: 0.0.0.0/0, corresponding to any, any ipv4 address is matched for example: 0::/0, corresponding to any, any ipv6 address is matched (3) address/mask <ports>: Specify IP and mask as well as port number. When a matched ipv4/ipv6 message is a TCP, UDP or SCTP message, a port number or a port number range can be specified. For example: 192.168.0.0/16 3000 4000-5000 |

4, three-stage action TLV:
discard;
forward;
redirect-ip;
redirect-http (redirect http messages);
redirect-nat(redirect CGN servces);
car (perform car speed limitation);
remark-ipv4-dscp (set the DSCP domain in the IPv4 header);
remark-ipv6-dscp (set the DSCP domain in the IPv6 header);
remark-mpls-exp (set the EXP domain of the MPLS header);
UPF predefine action (action predefined by UPF)

II. Interface QoS policy TLV:
1, interface QoS policy one-stage TLV;
2, interface QoS policy rule-action pair two-stage TLV;
3, interface QoS policy basic rule three-stage TLV;
Hierarchical examples;
Match QinQ C-Vlan ID;
Match QinQ S-Vlan ID;
Rules predefined by UPF.
4, Interface QoS policy basic action three-stage TLV:
Interface queue priority classification identification;
Strict priority scheduling level;
WFQ scheduling weight percentage;
Message queueout integer rate, e.g., Committed information rate (CIR) in Kbps;
Message queueout integer token bucket size, e.g., Committed Burst Size (CBS) in Kbytes;
Queue depth (cache) size;
Dscard priority of WRED;
Low threshold of discarding of WRED;
Low threshold of discarding of WRED;
Actions predefined by UPF.
III. User QoS policy TLV:
1, user QoS policy one-stage TLV;
2, user QoS policy rule-action pair two-stage TLV;
3, user QoS policy basic rule three-stage TLV:
Examples for hierarchy:
ipv4-dcsp (match IPv4 DSCP<0-63>);
ipv6-dcsp (match IPv6 DSCP<0-63>);
vlan-802.1p (match VLAN 802.1p<0-7>);
cvlan (match QinQ C-Vlan ID);
svlan (match the QinQ S-Vlan ID);
ipv4-acl (match IPv4 ACL);
Ipv6-acl (match IPv6 ACL);
Rules predefined by UPF.
4, User QoS policy action TLV:
and-or (a logical relationship between flow classifications);
fast-forward (low-latency fast forwarding);
schedule-grade (strict priority scheduling grade);
wfq-sch-percentage (WFQ scheduling weight percentage);
Cir (traffic limit promised rate, e.g., CIR);
Cbs (traffic limit promised token bucket size, e.g., CBS);
Pir (traffic limit peak rate, e.g., PIR);
PBS (traffic limit peak token bucket size, e.g., PbS);
queue-cache (queue depth (cache));
wred-discard-priority (discard priority of WRED)
wred-discard-high (low threshold of discard of WRED);
wred-discard-low (low threshold of discard of WRED);
Wred-discard-prob (discard probability of WRED);
UPF predefine action (action predefined by UPF)
Exemplary embodiment 3: an extension scheme of an ACL&QoS policy rule-action pair TLV of the forwarding plane of the forwarding and control plane separated BRAS based on a PCEP.

ACL&QoS policy TLVs per physical interface, per sub-interface, per user group and per user, and per service flow are extended and defined in the PCEP TLV type, and the rules and actions corresponding to various policies are nested and encapsulated in the data load of the upper-layer application message by means of a rule-action pair TLV. The control plane of the forwarding and control plane separated BRAS sends the upper-layer application message to the forwarding plane, and the forwarding plane de-encapsulates, parses and reads semantic values of the TLVs of all stages, and configures corresponding ACL&QoS policy, or ignores TLVs that are not suitable for a local device.

In the present exemplary embodiment, the following three types of TLVs are extended and defined:
I. ACL policy three-stage TLV
1, ACL policy TLV;
2, two-stage rule-action pair TLV;
3, three-stage rule TLV, the format of rules adopting an IPFilterRule attribute way defined by RFC 6733:
action dir proto from src to dst;
For example:
permit in ip from assigned to any
Parameters in IPFilterRule are described in Table 3:

TABLE 3

| Parameter | Value | Description |
|---|---|---|
| action | permit | Allow executing subsequent actions for all messages matching the rules |
|  | deny | Discard the messages matching the rules |
| dir | in | Message in direction |
|  | out | Message out direction |
| proto | ip | Match all ipv4 messages |
|  | ipv6 | Match all ipv6 messages |
|  | tcp | Match TCP messages |
|  | udp | Match UDP messages |
|  | sctp | Match SCTP messages |
|  | <proto-val> | Protocols carried in an IP packet are assigned by means of numerical values Range: 0 . . . 255 6 TCP 17 UDP 80 HTTP 132 SCTP and the like |
| src and dst | assigned | Mark an IP address identification user side assigned to a terminal |
|  | any | Any ip address |
|  | <address/mask> | address/mask address and mask assign an accurate ip address. |
|  | [ports] | ports: Specify ports Available formats are as follows: address: Only specify ip, and default full mask matching for example: 192.168.0.1 for example: 2002:1::0 for example: 0.0.0.0, corresponding to any, any ipv4 address is matched for example: 0::, corresponding to any, any ipv6 address is matched address/mask: ip and mask are specified for example: 192.168.0.0/16 for example: 2002:1111:2222::0/48 for example: 0.0.0.0/0, corresponding to any, any ipv4 address is matched for example: 0::/0, corresponding to any, any ipv6 address is matched address/mask <ports>: Specify IP and mask as well as port number. When a matched ipv4/ipv6 message is a TCP, UDP or SCTP message, a port number or a port number range can be specified. For example: 192.168.0.0/16 3000 4000-5000 |

4, three-stage basic action TLV:
discard;
forward;
redirect-ip;
redirect-http (redirect http messages);
redirect-nat (redirect CGN servces);
car (perform car speed limitation);
remark-ipv4-dscp (set the DSCP domain in the IPv4 header);
remark-ipv6-dscp (set the DSCP domain in the IPv6 header);
remark-mpls-exp (set the EXP domain of the MPLS header);
UPF predefine action (action predefined by UPF)
II. Interface QoS policy TLV:
1, interface QoS policy one-stage TLV;
2, interface QoS policy rule-action pair two-stage TLV;
3, interface QoS policy basic rule three-stage TLV;
Examples for hierarchy:
Match QinQ C-Vlan ID;
Match QinQ S-Vlan ID;
Rules predefined by UPF.
4, Interface QoS policy basic action three-stage TLV:
Interface queue priority classification identification;
Strict priority scheduling level;
WFQ scheduling weight percentage;
Message queueout integer rate, e.g., Committed information rate (CIR) in Kbps;
Message queueout integer token bucket size, e.g., Committed Burst Size (CBS) in Kbytes;
Queue depth (cache) size;
Dscard priority of WRED;
Low threshold of discarding of WRED;
Low threshold of discarding of WRED;
Actions predefined by UPF.
III. User QoS policy TLV:
1, user QoS policy one-stage TLV;
2, user QoS policy rule-action pair two-stage TLV;
3, user QoS policy basic rule three-stage TLV:
Examples for hierarchy:
ipv4-dcsp (match IPv4 DSCP<0-63>);
ipv6-dcsp (match IPv6 DSCP<0-63>);
vlan-802.1p (match VLAN 802.1p<0-7>);
cvlan (match QinQ C-Vlan ID);
svlan (match the QinQ S-Vlan ID);
ipv4-acl (match IPv4 ACL);
Ipv6-acl (match IPv6 ACL);
Rules predefined by UPF.
4, User QoS policy basic action TLV:
and-or (a logical relationship between flow classifications);
fast-forward (low-latency fast forwarding);
schedule-grade (strict priority scheduling grade);
wfq-sch-percentage (WFQ scheduling weight percentage);
Cir (traffic limit promised rate, e.g., CIR);
Cbs (traffic limit promised token bucket size, e.g., CBS);
Pir (traffic limit peak rate, e.g., PIR);
PBS (traffic limit peak token bucket size, e.g., PbS);
queue-cache (queue depth (cache));
wred-discard-priority (discard priority of WRED)
wred-discard-high (low threshold of discard of WRED);
wred-discard-low (low threshold of discard of WRED);
Wred-discard-prob (discard probability of WRED);
UPF predefine action (action predefined by UPF)
Exemplary embodiment 4: an extension scheme of an ACL&QoS policy rule-action pair IE of the forwarding plane of the forwarding and control plane separated BRAS based on a TR-459 PFCP.
ACL&QoS policy TLVs per physical interface, per sub-interface, per user group and per user, and per service flow are extended and defined in the TR-459 PFCP IE type, and the rules and actions corresponding to various policies are nested and encapsulated in the data load of the upper-layer application message by means of a rule-action pair IE. The control plane of the forwarding and control plane separated BRAS sends the upper-layer application message to the forwarding plane, and the forwarding plane de-encapsulates, parses and reads semantic values of the IEs of all stages, and configures corresponding ACL&QoS policy, or ignores IEs that are not suitable for a local device.

In the present exemplary embodiment, the following three types of Information Elements (IEs) are extended and defined:

I. ACL policy three-stage IE
1, ACL policy IE;
2, two-stage rule-action pair IE;
3, three-stage basic rule IE, the format of rules adopting an IPFilterRule attribute way defined
by RFC 6733:
action dir proto from src to dst;
For example:
permit in ip from assigned to any
Parameters in IPFilterRule are described in Table 4:

| Parameter | Value | Description |
|---|---|---|
| action | permit | Allow executing subsequent actions for all messages matching the rules |
|  | deny | Discard the messages matching the rules |
| dir | in | Message in direction |
|  | out | Message out direction |
| proto | ip | Match all ipv4 messages |
|  | ipv6 | Match all ipv6 messages |
|  | tcp | Match TCP messages |
|  | udp | Match UDP messages |
|  | sctp | Match SCTP messages |
|  | <proto-val> | Protocols carried in an IP packet are assigned by means of numerical values Range: 0 . . . 255 6 TCP 17 UDP 80 HTTP 132 SCTP and the like |
| src and dst | assigned | Mark an IP address identification user side assigned to a terminal |
|  | any | Any ip address |
|  | <address/mask> [ports] | address/mask: Specify an accurate ip address. ports: Specify ports Available formats are as follows: address: Only specify ip, and default full mask matching for example: 192.168.0.1 for example: 2002:1::0 for example: 0.0.0.0, corresponding to any, any ipv4 address is matched for example: 0::, corresponding to any, any ipv6 address is matched address/mask: ip and mask are specified for example: 192.168.0.0/16 for example: 2002:1111:2222::0/48 for example: 0.0.0.0/0, corresponding to any, any ipv4 address is matched for example: 0::/0, corresponding to any, any ipv6 address is matched address/mask <ports>: Specify IP and mask as well as port number. When a matched ipv4/ipv6 message is a TCP, UDP or SCTP message, a port number or a port number range can be specified. For example: 192.168.0.0/16 3000 4000-5000 |

4, three-stage basic action IE:
discard;
forward;
redirect-ip;
redirect-http (redirect http messages);
redirect-nat (redirect CGN servces);
car (perform car speed limitation);
remark-ipv4-dscp (set the DSCP domain in the IPv4 header);
remark-ipv6-dscp (set the DSCP domain in the IPv6 header);
remark-mpls-exp (set the EXP domain of the MPLS header);
UPF predefine action (action predefined by UPF)

II. Interface QoS policy IE:
1, interface QoS policy one-stage IE;
2, interface QoS policy rule-action pair two-stage IE;
3, interface QoS policy basic rule three-stage IE;
Hierarchical examples;
Match QinQ C-Vlan ID;
Match QinQ S-Vlan ID;
Rules predefined by UPF.
4, Interface QoS policy basic action three-stage IE;
Interface queue priority classification identification;
Strict priority scheduling level;
WFQ scheduling weight percentage;
Message queueout integer rate, e.g., Committed information rate (CIR) in Kbps;
Message queueout integer token bucket size, e.g., Committed Burst Size (CBS) in Kbytes;
Queue depth (cache) size;
Dscard priority of WRED;
Low threshold of discarding of WRED;
Low threshold of discarding of WRED;
Actions predefined by UPF.

III. User QoS policy IE:
1, user QoS policy one-stage IE;
2, user QoS policy rule-action pair two-stage IE;
3, user QoS policy basic rule three-stage IE;
Examples for hierarchy:
ipv4-dcsp (match IPv4 DSCP<0-63>);
ipv6-dcsp (match IPv6 DSCP<0-63>);
vlan-802.1p (match VLAN 802.1p<0-7>);
cvlan (match QinQ C-Vlan ID);
svlan (match the QinQ S-Vlan ID);
ipv4-acl (match IPv4 ACL);
Ipv6-acl (match IPv6 ACL);
Rules predefined by UPF.
4, User QoS policy action IE:
and-or (a logical relationship between flow classifications);
fast-forward (low-latency fast forwarding);
schedule-grade (strict priority scheduling grade);
wfq-sch-percentage (WFQ scheduling weight percentage);
Cir (traffic limit promised rate, e.g., CIR);
Cbs (traffic limit promised token bucket size, e.g., CBS);
Pir (traffic limit peak rate, e.g., PIR);
PBS (traffic limit peak token bucket size, e.g., PbS);
queue-cache (queue depth (cache));
wred-discard-priority (discard priority of WRED)
wred-discard-high (low threshold of discard of WRED);
wred-discard-low (low threshold of discard of WRED);
Wred-discard-prob (discard probability of WRED);
UPF predefine action (action predefined by UPF)

To sum up, traditional network configuration management data are described by means of the user ACL&QoS policies and rule-action pair multi-stage TLVs of the user ACL&QoS policies, and the user ACL&QoS policies are issued through a non management interface. The traditional hierarchical QoS configuration data is flattened by means of the rule-action pair TLV mode. The configured device can flexibly select configuration data according to its own structure, without being constrained by the data structure of the traditional YANG model. The configuration data is issued by means of controlling an interface protocol such as S-CUSP and PFCP, which is more efficient and flexible. The industrial difficulty that effective intercommunication between the forwarding and control plane separated BRAS YANG models from different manufactures cannot be implemented may be addressed.

Through the description of the above implementations, those having ordinary skill in the art can clearly understand that the method according to the above embodiment can be implemented by means of software and necessary general hardware platforms, of course, it can also be implemented by hardware, but in many cases, the former is better. Based on this understanding, the technical solution of the present disclosure essentially or the part that contributes to the related art can be embodied in the form of a software product, and the computer software product is stored in one storage medium (such as a read-only memory (ROM)/a random access memory (RAM), a magnetic disk, and an optical disk) and includes several instructions to enable a terminal device (which can be a mobile phone, a computer, a server, or a network device, etc.) to execute the methods described in the various embodiments of the present disclosure.

The embodiments also provide a network configuration sending apparatus. The apparatus is used for realizing the above embodiments and exemplary implementations. Those described will not be repeatedly described. As used below, the term "module" can implement a combination of software and/or hardware with predetermined functions. Although the apparatuses described in the following embodiments are preferably implemented by software, implementation by hardware or a combination of software and hardware is also possible and conceived.

Figure 6:
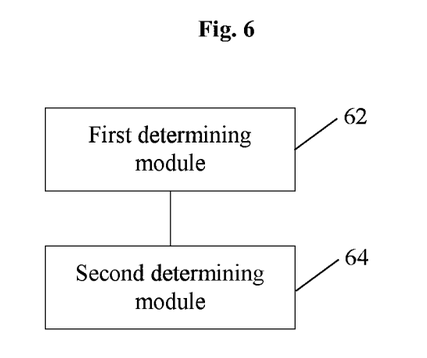
FIG. 6 is a structural block diagram of a network configuration sending apparatus according to the embodiments of the present disclosure.

FIG. 6 is a structural block diagram of a network configuration sending apparatus according to the embodiments of the present disclosure. As shown in FIG. 6, the apparatus includes:
- a first determining module 62, configured to determine N rule-action pairs corresponding to the QoS configuration information of each layer in HQoS configuration, wherein the N rule-action pairs are used for representing network configuration rules and network configuration actions corresponding to the QoS configuration information, and N is a natural number greater than or equal to 1; and
- a first sending module 64, configured to send, to a forwarding plane of a BRAS, target QoS configuration information mapped with the N rule-action pairs, wherein the forwarding plane is used for configuring the target QoS configuration information into a target device to configure a network of the target device.

In some exemplary embodiments, the above first determining module 62 includes:
- a first configuration unit, configured to define the QoS configuration information of each layer in the HQoS configuration based on a preset protocol;
- a first determining unit, configured to determine rule information and action information corresponding to the QoS configuration information of each layer in the HQoS configuration, wherein the rule information includes a rule type, a rule length and a rule value, and the action information includes an action type, an action length and an action value; and
- a second determining unit, configured to determine, based on the rule information and the action information, the N rule-action pairs corresponding to the QoS configuration information of each layer in the HQoS configuration.

In some exemplary embodiments, the above first sending module 64 includes:
- a first sending unit, configured to send, to the forwarding plane of the BRAS based on structural information between the N rule-action pairs and the target QoS configuration information, the target QoS configuration information mapped with the N rule-action pairs, wherein the structural information includes a mapping relationship between the N rule-action pairs and the target QoS configuration information.

In some exemplary embodiments, the above apparatus may further include:
- a third determining module, configured to determine a TLV of the QoS configuration information of each layer after the N rule-action pairs corresponding to the QoS configuration information of each layer in the HQoS configuration are determined; and
- a fourth determining module, configured to determine, according to semantic information of the TLV, one or more rule-action pair combinations corresponding to the QoS configuration information, wherein the N rule-action pairs include the one or more rule-action pair combinations.

In some exemplary embodiments, the above apparatus may further include:
- a fifth determining module, configured to determine, after the N rule-action pairs corresponding to the QoS configuration information of each layer in the HQoS configuration are determined, one or more rule-action pair combinations corresponding to the QoS configuration information, wherein the N rule-action pairs comprise the one or more rule-action pair combinations;
- a sixth determining module, configured to determine a transmission message for data transmission between a control plane and the forwarding plane of the BRAS; and
- a seventh determining module, configured to determine the one or more rule-action pair combinations as a data load of the transmission message based on a message type of the transmission message.

In some exemplary embodiments, the above first sending module 64 includes:
- a first encapsulation unit, configured to encapsulate the N rule-action pairs to an upper-layer application message; and
- a second sending unit, configured to send the upper-layer application message to the forwarding plane, wherein the forwarding plane is used for de-encapsulating and parsing the upper-layer application message to obtain the N rule-action pairs, so as to determine the target QoS configuration information mapped by the N rule-action pairs, and configuring the target QoS configuration information into the target device to configure the network of the target device.

In some exemplary embodiments, the above sending module 64 includes:
- a third sending unit, configured to send, to the forwarding plane of the BRAS by using a state interface protocol, the target QoS configuration information mapped with the N rule-action pairs.

Figure 7:
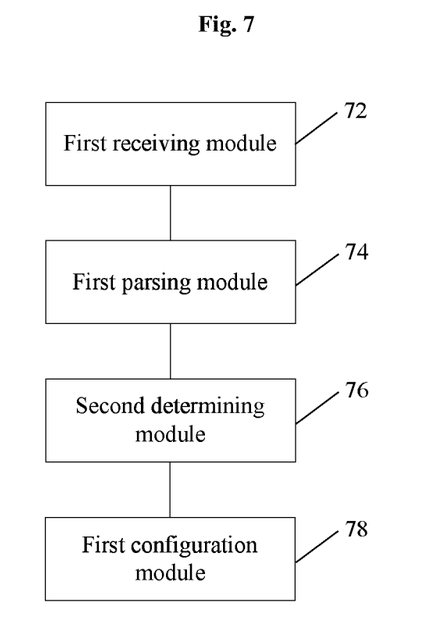
FIG. 7 is a structural block diagram of a network configuration apparatus according to the embodiments of the present disclosure.

FIG. 7 is a structural block diagram of a network configuration apparatus according to the embodiments of the present disclosure. As shown in FIG. 7, the apparatus includes: a first receiving module 72, a first parsing module 74, a second determining module 76 and a first configuration module 78. The apparatus is described in detail below.

The first receiving module 72 is configured to receive an upper-layer application message sent by a control plane of a BRAS.

The first parsing module 74 is configured to parse the upper-layer application message to obtain N rule-action pairs encapsulated in the upper-layer application message, wherein the N rule-action pairs are used for representing network configuration rules and network configuration actions corresponding to QoS configuration information, and N is a natural number greater than or equal to 1.

The second determining module 76 is configured to determine target QoS configuration information mapped with the N rule-action pairs.

The first configuration module 78 is configured to configure the target QoS configuration information into a target device to configure a network of the target device.

It should be noted that all the above modules can be implemented by software or hardware. For the latter, they can be implemented by the following methods, but are not limited to this. The above-mentioned modules are all located in a same processor, or all the above-mentioned modules are respectively located in different processors in any combination form.

The embodiments of the present disclosure also provide a computer-readable storage medium. The computer-readable storage medium stores a computer program. The computer program is configured to, when running, implement the operations in any of the above method embodiments.

In some exemplary embodiments, the above computer-readable storage medium may include, but not limited to, a USB flash disk, a Read-Only Memory (ROM), a Random Access Memory (RAM), a mobile hard disk, a magnetic disk or an optical disk, and other various media capable of storing computer programs.

The embodiments of the present disclosure also provide an electronic device, including a memory and a processor. The memory stores a computer program. The processor is configured to execute the computer program to execute the operations in any of the above-mentioned method embodiments.

In some exemplary embodiments, the above electronic device may further include a transmission device and an input/output device. The transmission device is connected to the above processor, and the input/output device is connected to the above processor.

For specific examples in the embodiments, reference may be made to the examples described in the foregoing embodiments and exemplary implementations, and details are not described herein again in the embodiments.

Apparently, those having ordinary skill in the art should understood that the above-mentioned modules or operations of the present disclosure can all be implemented by a general-purpose computing apparatus, and they can be integrated on a single computing apparatus, or distributed on a network composed of multiple computing apparatuses. They can be implemented using computing-apparatus-executable program codes such that they can be stored in a storage apparatus and executed by computing apparatuses. In some cases, the operations shown or described can be performed in an order different from that herein, or they are separately fabricated into individual integrated circuit modules, or multiple modules or operations in them are fabricated into single integrated circuit modules. In this way, the present disclosure is not limited to any particular hardware and software combinations.

The above descriptions are only optional embodiments of the present disclosure, and are not intended to limit the present disclosure. Those having ordinary skill in the art can make various modifications and changes to the present disclosure. Any modification, equivalent replacement, improvement, etc. made within the principles of the present disclosure shall all fall within the protection scope of the present disclosure.

What is claimed is:

1. A network configuration sending method, comprising following operations performed by a control plane of a Broadband Remote Access System (BRAS):
   determining N rule-action pairs corresponding to Quality of Service (QOS) configuration information of each layer in Hierarchical Quality of Service (HQoS) configuration, wherein the N rule-action pairs represent network configuration rules and network configuration actions corresponding to the QoS configuration information, and N is a natural number greater than or equal to 1; and
   sending, to a forwarding plane of the BRAS, target QoS configuration information mapped with the N rule-action pairs to trigger the forwarding plane to configure the target QoS configuration information into a target device to configure a network of the target device,
   wherein determining the N rule-action pairs corresponding to the QoS configuration information of each layer in the HQOS configuration comprises:
   defining the QoS configuration information of each layer in the HOOS configuration based on a preset protocol;
   determining rule information and action information corresponding to the QoS configuration information of each layer in the HQOS configuration, wherein the rule information comprises a rule type, a rule length and a rule value, and the action information comprises an action type, an action length and an action value; and
   determining, based on the rule information and the action information, the N rule-action pairs corresponding to the QoS configuration information of each layer in the HQOS configuration.

2. The method according to claim 1, wherein sending, to the forwarding plane of the BRAS, the target QoS configuration information mapped with the N rule-action pairs comprises:
   sending, to the forwarding plane of the BRAS based on structural information between the N rule-action pairs and the target QoS configuration information, the target QoS configuration information mapped with the N rule-action pairs, wherein the structural information comprises a mapping relationship between the N rule-action pairs and the target QoS configuration information.

3. The method according to claim 1, wherein after determining the N rule-action pairs corresponding to the QoS configuration information of each layer in the HQOS configuration, the method further comprises:
   determining a Type Length Value (TLV) of the QoS configuration information of each layer; and
   determining, according to semantic information of the TLV, one or more rule-action pair combinations corresponding to the QoS configuration information, wherein the N rule-action pairs comprise the one or more rule-action pair combinations.

4. The method according to claim 3, wherein
   the TLV is defined for each hierarchical ACL&QoS policy, a rule-action pair combination contained in the TLV is defined by semantics of the TLV of the hierarchical ACL&QoS policy, and the rule-action pair TLV is used as a subordinate nested TLV of the ACL&QoS policy TLV.

5. The method according to claim 3, wherein
an ACL&QoS policy is represented by a type of a message issued by the control plane of the BRAS, and a rule-action pair TLV combination contained in the ACL&QoS policy is used as a data load of the message.

6. The method according to claim 1, wherein after determining the N rule-action pairs corresponding to the QoS configuration information of each layer in the HQOS configuration, the method further comprises:
determining one or more rule-action pair combinations corresponding to the QoS configuration information, wherein the N rule-action pairs comprise the one or more rule-action pair combinations; and
determining a transmission message for data transmission between the control plane and the forwarding plane of the BRAS; and
determining the one or more rule-action pair combinations as a data load of the transmission message based on a message type of the transmission message.

7. The method according to claim 1, wherein sending, to the forwarding plane of the BRAS, the target QoS configuration information mapped with the N rule-action pairs comprises:
encapsulating the N rule-action pairs to an upper-layer application message; and
sending the upper-layer application message to the forwarding plane, wherein the forwarding plane is used for de-encapsulating and parsing the upper-layer application message to obtain the N rule-action pairs, so as to determine the target QoS configuration information mapped by the N rule-action pairs, and configuring the target QoS configuration information into the target device to configure the network of the target device.

8. The method according to claim 7, wherein sending the upper-layer application message to the forwarding plane comprises:
issuing the upper-layer application message to the forwarding plane by using a state control interface protocol.

9. The method according to claim 1, wherein sending, to the forwarding plane of the BRAS, the target QoS configuration information mapped with the N rule-action pairs comprises:
sending, to the forwarding plane of the BRAS by using a state interface protocol, the target QoS configuration information mapped with the N rule-action pairs.

10. The method according to claim 1, wherein the preset protocol comprises at least one of: a Simple-Control and User Plane Separation Protocol (S-CUSP), a Border Gateway Protocol-Link State (BGP-LS), a Path Computation Entity Protocol (PCEP), and a TR-459 Packet Forwarding Control Protocol (PFCP).

11. The method according to claim 1, wherein the BRAS is a forwarding and control plane separated BRAS.

12. A non-transitory computer-readable storage medium, the computer-readable storage medium storing a computer program, the computer program, when executed by a processor, implementing the operations of the method according to claim 1.

13. An electronic device, comprising a memory, a processor, and a computer program stored on the memory and executable on the processor, the processor, when executing the computer program, implementing the operations of the method according to claim 1.

14. A network configuration method, comprising following operations performed by a forwarding plane of a Broadband Remote Access System (BRAS):
receiving an upper-layer application message sent by a control plane of the BRAS;
parsing the upper-layer application message to obtain N rule-action pairs encapsulated in the upper-layer application message, wherein the N rule-action pairs represent network configuration rules and network configuration actions corresponding to Quality of Service (Qos) configuration information, and N is a natural number greater than or equal to 1;
determining target QoS configuration information mapped with the N rule-action pairs; and
configuring the target QoS configuration information into a target device to configure a network of the target device.

15. The method according to claim 14, wherein configuring the target QoS configuration information into the target device to configure the network of the target device comprises:
configuring the rule-action pairs supported by the target device into the target device.

16. The method according to claim 14, wherein configuring the target QoS configuration information into the target device to configure the network of the target device comprises:
ignoring the rule-action pairs not supported by the target device.

17. The method according to claim 14, wherein determining target QoS configuration information mapped with the N rule-action pairs comprises:
parsing the N rule-action pairs; and
obtaining rule information and action information corresponding to the N rule-action pairs, wherein the rule information comprises a rule type, a rule length and a rule value, and the action information comprises an action type, an action length and an action value.

18. A non-transitory computer-readable storage medium, the computer-readable storage medium storing a computer program, the computer program, when executed by a processor, implementing the operations of the method according to claim 14.

19. An electronic device, comprising a memory, a processor, and a computer program stored on the memory and executable on the processor, the processor, when executing the computer program, implementing the operations of the method according to claim 14.

* * * * *